(12) United States Patent
Pivetta

(10) Patent No.: US 8,220,860 B2
(45) Date of Patent: Jul. 17, 2012

(54) CONTROL DEVICE FOR OPENING AND CLOSING OPEN TOP BODIES IN INDUSTRIAL VEHICLES

(75) Inventor: Cesarino Pivetta, Brugnera (IT)

(73) Assignees: Trakover S.R.L., Portogruaro (IT); Tecnoengineering, Zoagli (IT)

( * ) Notice: Subject to any disclaimer, the term of this patent is extended or adjusted under 35 U.S.C. 154(b) by 236 days.

(21) Appl. No.: 12/520,047

(22) PCT Filed: Dec. 20, 2006

(86) PCT No.: PCT/EP2006/069961
§ 371 (c)(1),
(2), (4) Date: Dec. 30, 2009

(87) PCT Pub. No.: WO2007/124787
PCT Pub. Date: Nov. 8, 2007

(65) Prior Publication Data
US 2010/0109373 A1    May 6, 2010

(51) Int. Cl.
*B60P 7/04* (2006.01)
(52) U.S. Cl. .......... 296/100.12; 296/100.13; 296/100.15
(58) Field of Classification Search .......... 296/98, 296/100.11–100.18, 136.03, 136.1–136.13
See application file for complete search history.

(56) References Cited

U.S. PATENT DOCUMENTS

| 3,942,830 | A  | * | 3/1976  | Woodard       | 296/105    |
|-----------|----|---|---------|---------------|------------|
| 6,142,554 | A  | * | 11/2000 | Carroll et al.| 296/100.12 |
| 6,481,779 | B1 | * | 11/2002 | Gothier et al.| 296/100.13 |
| 6,582,007 | B2 | * | 6/2003  | Gothier et al.| 296/100.11 |
| 7,261,362 | B1 | * | 8/2007  | Mendez        | 296/100.12 |
| 7,887,117 | B2 | * | 2/2011  | Pivetta       | 296/100.13 |
| 7,954,877 | B2 | * | 6/2011  | Smith et al.  | 296/100.17 |

FOREIGN PATENT DOCUMENTS

| EP | 1 228 912   | 8/2002  |
|----|-------------|---------|
| EP | 1 529 671   | 5/2005  |
| EP | 1 738 946   | 1/2007  |
| WO | WO 96/33882 | 10/1996 |

* cited by examiner

*Primary Examiner* — Glenn Dayoan
*Assistant Examiner* — Gregory Blankenship
(74) *Attorney, Agent, or Firm* — Stradley Ronon Stevens & Young, LLP

(57) ABSTRACT

Control device for both opening and closing the sheets or tarpaulins used to cover the open top bodies in the industrial, agricultural and/or similar vehicles wherein driving pulleys (6a-6b) are set in motion by means of bevel gears (7a, 7b and 7c), wherein the gear (7a) with the first driving pulley (6a) and the gear (7c) with a second driving pulley (6b) are mounted coaxially one in front of the other on the opposite sides of the central bevel gear (7b) which is manually driven by means of the crank (81) and its driving shaft (8), and in that the lengths of the cable rings (3c and 3f) driven by the driving pulleys which extend between additional pulleys (5d-5'd and 5s-5's) are disposed parallel one another so that the upper lateral lengths (3a) of the cable rings move in the same directions.

9 Claims, 3 Drawing Sheets

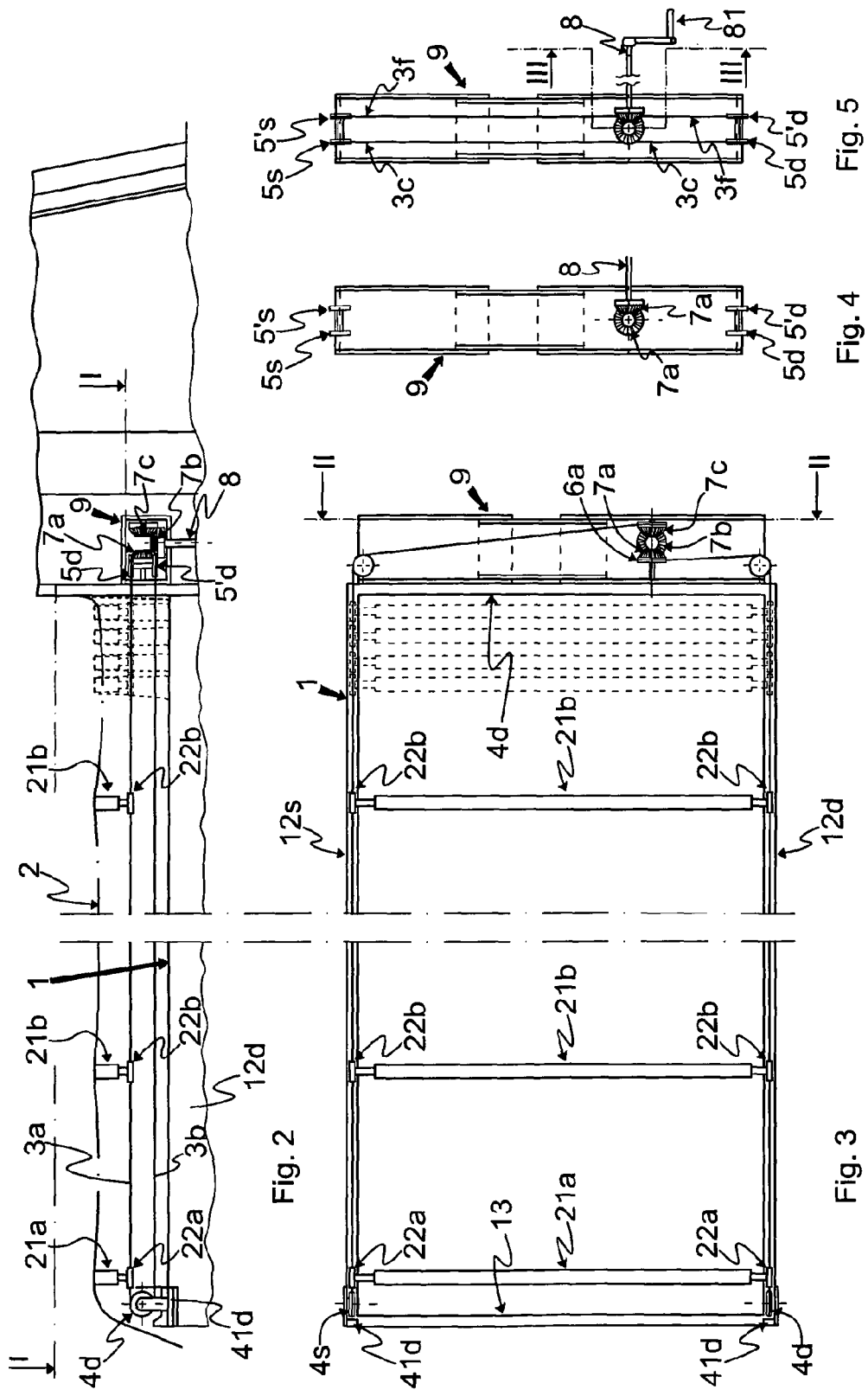

CONTROL DEVICE FOR OPENING AND CLOSING OPEN TOP BODIES IN INDUSTRIAL VEHICLES

FIELD OF THE INVENTION

Figure 1:
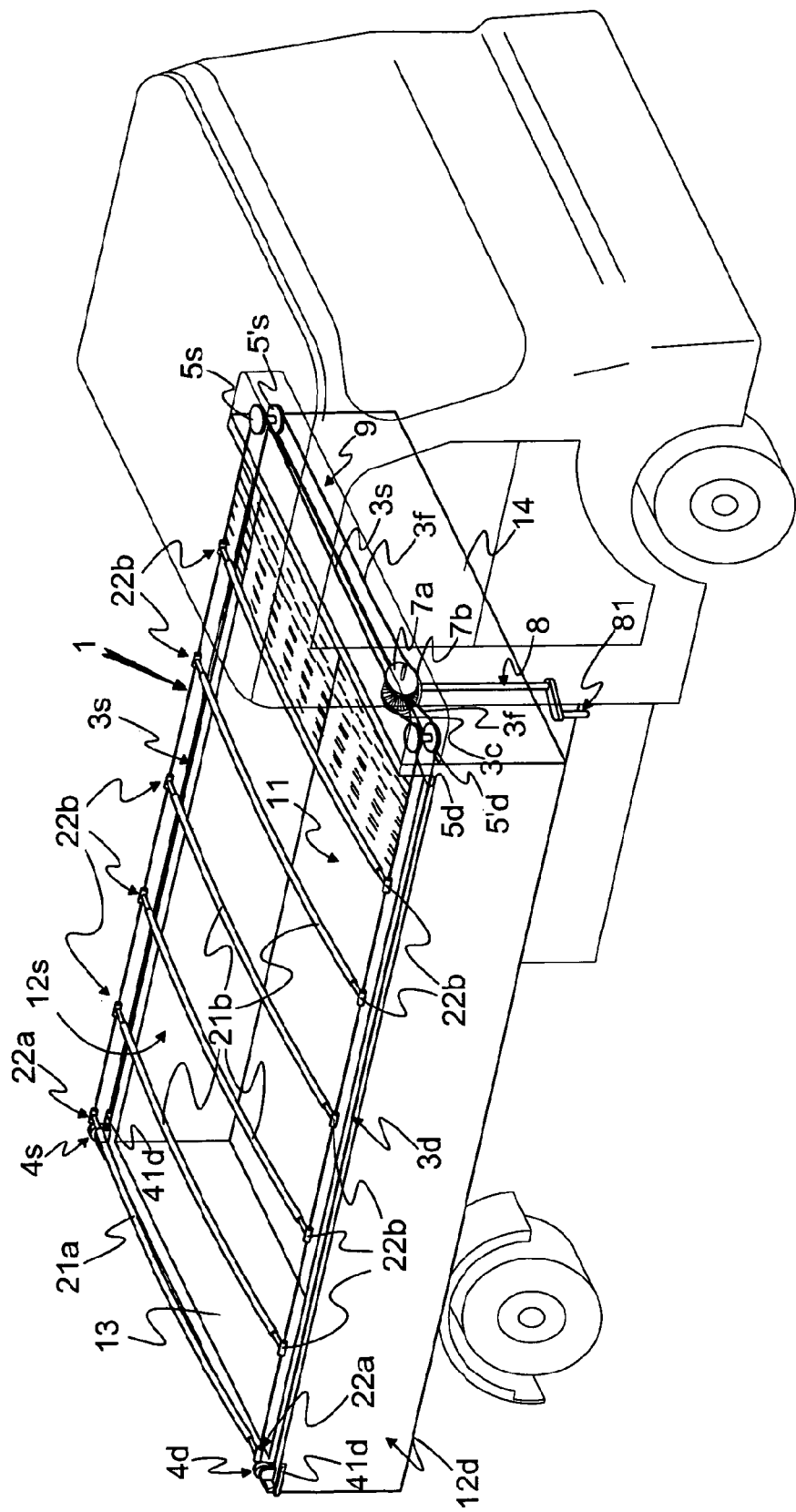

The present invention relates to a control device for both opening and closing the sheets used to cover the open top bodies in the industrial, agricultural and/or similar vehicles. Such control device allows to open as well as to close the sheets or tarpaulins for covering the bodies of the vehicles by means of easy and simple operations.

BACKGROUND OF THE INVENTION

As they are well known, above all and not only, in the industrial vehicles field, sheets or tarpaulins are used to cover the so-called open top boxes or bodies of the vehicles in order to cover, protect, hold in place and therefore to prevent the spilling of the transported materials.

In case of the transport of unstable and loose materials, as for example sand, gravel and such construction materials, the aerodynamic turbulence can take them away from their loading place in the body of the vehicle and release them on the following vehicles.

This causes driving troubles and accident risks due to poor visibility, windshield cracking or breaking in the following vehicles as well as to other drawbacks as the defilement or the eventual pollution of the road surface. Different solutions are already known in the field of the sheets used to cover the vehicles bodies.

Such solutions are complicated, expensive and must be each time realized according to the real dimensions of the vehicle body to be covered, thereby involving long working times and difficult operations for their application.

Moreover, such solutions imply complicated systems which are for example composed by drive shafting to transmit rotary motion and power to the centerings supporting the tarpaulin.

Such shafting are equipped with conical pairs, to transmit their rotary motion to other shafts which are placed in the corners of said open top bodies, and they require reduction gears in order to lower the stress to be applied for moving the whole system.

The above described systems are not easy to operate by manual operations because they are very heavy and produce remarkable frictional forces even though they are equipped with reduction gear. Therefore, such systems require auxiliary actuating means as electric motors or other similar means.

The EP 1 228 912 discloses a device for opening and closing the cover sheets of vehicles, constituted by driving pulleys set in motions by means of a pair of bevel gears. The driving pulleys are mounted both on the same gear and therefore they rotate in the same direction, leading to the fact that the cable ring extending from one of the two pulleys must be crossed in order to make the upper lateral lengths move in the same direction. This has the disadvantage that the tension of the crossed and non crossed cables are not the same with consequent non-uniform distribution of the strengths; furthermore, as a consequence of the crossing of one cable, its direction of entrance into the couple of lateral pulleys ($5s$ and $5's$ in FIG. 1) is slanted with respect to the grooving of said pulleys, what could lead to possible slipping outs of the cable.

DISCLOSURE OF THE INVENTION

It is therefore an object of the present invention to provide an easy to operate, structurally simple and secure control device for opening and closing the cover sheets of vehicles, allowing a symmetrical distribution of the cable tension on both sides of the vehicle top body and a linear and secure sliding of said cable in the driving pulleys.

A system constituting a solution to this problem is defined in claim 1. Other advantageous aspects of the invention are defined in the dependent claims.

For a better comprehension of the subject-matter of the present invention reference is made hereinafter to the enclosed figures. In order to allow an easy and secure tightening of the cable rings ($3d$ and $3s$) sliding along the lateral gates of the open top body of a vehicle, the present invention provides a control device where the driving pulleys ($6a$-$6b$) are set in motion by means of bevel gears ($7a$, $7b$ and $7c$), wherein the gear $7a$ with the driving pulley $6a$ and the gear $7c$ with the driving pulley $6b$ are mounted coaxially one in front of the other on the opposite sides of the central bevel gear $7b$ which is manually driven by means of the crank ($81$) and its driving shaft ($8$). The lengths of the cable rings ($3c$ and $3f$) extending between said pulleys ($5d$-$5'd$ and $5s$-$5's$) are disposed parallel one another so that the upper lateral lengths ($3a$) move in the same directions.

By means of this device, it is therefore possible to distribute uniformly the cable tension from the pulleys $6a$ and $6b$, avoiding the crossing of the cable and thus making it enter the lateral pulleys $5'd$ and $5's$ in perfect alignment with their grooving, what effectively avoids the risks of cable slipping-out.

DETAILED DESCRIPTION OF THE DRAWINGS

FIG. 1 is a perspective view of the control device according to the present invention which is mounted on the open top body of a common vehicle some parts of which being drawn with a thin line for clarity reasons.

The FIG. 2 shows a lateral view of the control device according to the present invention which is mounted on the generically open top body of a preferred vehicle wherein the maximum extended position of the covering tarpaulin is shown in heavy dashed lines and the maximum retracted uncovering position of the tarpaulin is indicated by light dot-dashed lines.

The FIG. 3 is a plan view of only the open top body and its control device sectioned along the line I-I of the FIG. 2, wherein the retracted position of the centerings supporting the tarpaulin is indicated in light dashed lines.

The FIG. 4 is a sectional view taken along the line II-II in the FIG. 3 illustrating only the position of the main components, the movement group and return sheaves, which are placed in the tubular telescopic element applied to the upper-front portion of the front wall of the open top body.

The FIG. 5 illustrates, as the FIG. 4, the same tubular telescopic casing but including the cables used to move the covering of the open top body.

Figure 6:
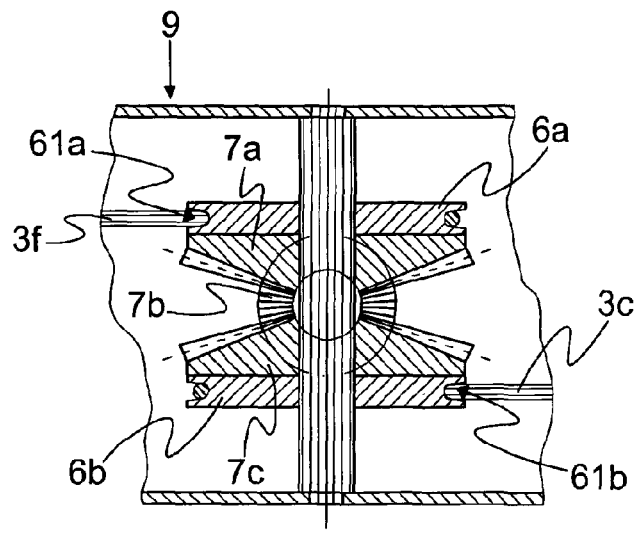

The FIG. 6 is an enlarged sectional view, taken along the line III-III in the FIG. 5, of the movement group housed in the tubular telescopic casing.

Figure 7:
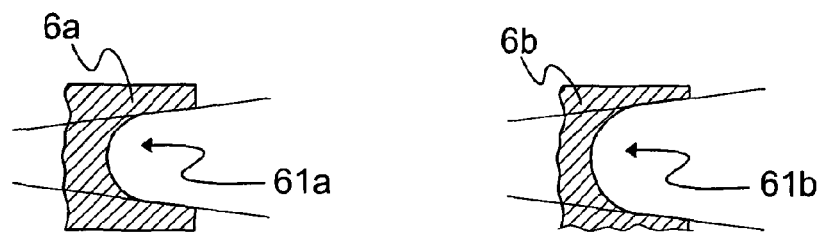

The FIG. 7 is a further enlarged and detailed view of the grooved rims of the pulleys included in the movement group illustrated in the previous FIG. 6.

Figure 8:
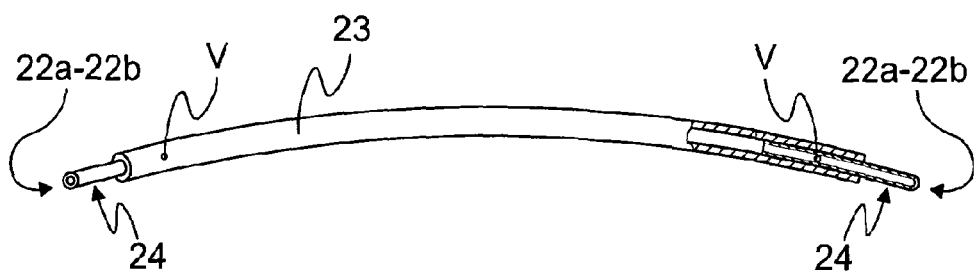

The FIG. 8 is a partially broken front view of the telescopic centering used to support covering sheets of different width.

In the above mentioned figures, the common items are marked with the same reference numbers.

With particular reference to FIGS. 1, 2, and 3 it is to be noticed the open top body 1 of a generic industrial vehicle (indicated in thin lines) in which is mounted the control device according to the present invention.

The open top body I has a bottom 11, the lateral gates 12d and 12s, the rear movable gate 13 and the front fixed wall 14.

The control device forming the object of the present invention is applied to the above mentioned open top body 1 and it is clearly and completely illustrated in the FIG. 1, while the other FIGS. 2, 3, 4, 5, 6 and 7 show, by means of various views and sections, the components forming the said control device.

According to such a control device, the covering tarpaulin 2 is not shown in the FIGS. 1 and 3 for illustrative clarity and simplicity reasons.

On the contrary, the covering tarpaulin 2 is shown only in the FIG. 2 where its maximum extended position, or rather the covering position on the whole open top body 1, is indicated in heavy dashed lines, while its retracted position, where the tarpaulin results contracted next to front fixed wall 14 of the open top body 1 and uncovers the whole open top body 1, is indicated by light dot-dashed lines.

Said tarpaulin 2 is supported by centerings 21a and 21b which are essentially equal one another.

As it can be seen in FIGS. 1, 2, 3 and with particular reference to FIG. 8, said centerings are composed of tubular and telescopically adjustable elements which are hereinafter in detail described.

With reference to said FIG. 8, it is to be noticed that such centerings 21a and 21b have the same structure and are essentially constituted by a central length 23 which is formed by a suitable piece of metallic tube. The metallic tube is suitably curved in such a way as to constitute a centering 21a-21b which forms a wall bulging upwards for supporting the tarpaulin 2.

In the ends of the tubular piece forming the central length 23 are nested respective tubular pieces 24. Said inner pieces 24 have an outer diameter which is equal to the inner diameter of said central length 23 and are moreover curved in the same manner so that they can freely slide within the central length 23.

The outer ends of said tubular pieces 24 are welded to respective short tubular pieces 22a and 22b which are equal one another and are extending orthogonally to the same tubular pieces 24.

Clearly, the result is that the length of the centerings 21a and 21b can vary in order to be suitable for the various lengths of the open top body 1 on which is mounted the control device forming the object of the present invention. The final length can be fixed by means of suitable screws V, rivets or the like.

Even though said centerings 21a and 21b are equal one another, they are different in their application and therefore in their function.

More precisely, the centering 21a is solidly fixed on the upper length of the cable 3a by means its short tubular pieces 22a, while the other centerings 21b can slide on said upper length of the cable 3a by means their short tubular pieces 22b.

Practically, the short tubular pieces of the rear centering 21a are fixed on the cable 3a with known means and in known ways, while the short tubular pieces 22b of the movable centerings 21b can freely slide along said upper length of the cable 3a placed inside themselves.

Clearly, the short tubular pieces 22a, 22b and the respective length of the upper cable 3a are symmetrically applied to both sides of the open top body, in particular to the upper portion of the lateral gates 12d and 12s.

With reference to the above-mentioned figures of the drawings, said length of the upper cable 3a is a portion of a cable forming an annular element. More precisely, the present embodiment of the invention provides two different cables forming different annular elements which are differing only for the length and therefore, as hereinafter described, for the arrangement only in the front driving part.

The so resulting two cable rings are marked with the reference numbers 3d and 3s because they are used on two different sides.

Practically, both cable rings 3d and 3s slide within the grooves of the respective rear vertical pulleys 4d and 4s which are applied to the ends of the upper edges of the relative lateral gates 12d and 12s.

At this point, the cable rings 3d and 3s slide within the grooves of the pair of front horizontal pulleys 5d and 5'd, 5s and 5's which are slightly protruding from the lateral ends of a telescopic casing 9 constituted by suitable tubular pieces of square or rectangular cross-section which are slidably nested one within the other.

After which, the cable rings 3d and 3s roll in a relative groove of a pair of vertical driving pulleys 6a and 6b which are housed in the same telescopic casing 9.

It is to be pointed out that such telescopic casing 9, as it can be seen from the FIGS. 1 and 2, is removably or irremovably fixed, by means of known systems and means, on the front-upper portion of the open top body 1, more precisely on the upper-outer portion of the front wall 14 of the open top body 1.

Such vertical driving pulleys 6a and 6b are solidly connected to bevel gears 7a and 7c respectively, mounted coaxially one in front of the other on the opposite sides of a central bevel gear 7b in which they engage. The bevel gear 7b is connected to a driving shaft 8 equipped with a crank 81 in its opposite free end.

For clarity reasons, the particular group composed of the pair of vertical driving pulleys 6a and 6b and of the respective pair of driving bevel gears 7a-7c, is shown in the enlarged view of FIG. 6.

Moreover, the particular shape of the grooves 61a and 61b in said vertical driving pulleys 6a and 6b is shown in a further enlarged view of FIG. 7.

It is to be pointed out that in the described embodiment of the invention the preferred ratio of the bevel gear 7a velocity to the corresponding bevel gear 7b velocity is of 3 to 1 because it proved to be the most suitable velocity ratio for the use of such control device.

It is well understood that the movement of the vertical driving pulleys 6a and 6b can be effected by means of a suitable power group, as for example a motor reducer and/or similar means rather than systems which require manual operations.

It is to be pointed out that the right upper lengths 3a, the right lower lengths 3b, the right upper lengths 3c and the right lower lengths 3f constitute the cable ring 3d of the right side and slide, parallel one another, in the grooves of the respective pulleys 4d, 5d, 5'd and 6a.

The corresponding lengths of the left side, namely the left upper length 3a and the left lower length 3b are too parallel one another, and so are also the respective left lengths 3c and 3f.

As it can clearly seen from the FIG. 7, it is to be pointed out that not only the grooves 61a and 61b of the driving pulleys 6a and 6b have a width equal to the diameter of the therein engaged cables in order to avoid any slightest slipping of both cable rings 3d and 3s within the grooves 61a and 61b of the respective driving pulleys 6a and 6b but also such grooves are suitably V shaped and their sides converge inwards and present suitably roughened surface in order to enhance friction and to avoid the above mentioned cable slipping.

After the description of all the components for moving the tarpaulin it is to be pointed out that the group composed of the horizontal driving pulley 5s, 5's, 5d and 5'd as well as the group constituted by the vertical driving pulleys 6a and 6b which are integral with the driving bevel gears 7a-7c are contained in a box-like telescopic casing 9 which can be lengthened and/or shortened according to the requirements involved by the open top body on which said control device must be used.

Both cable rings 3d and 3s are suitably tightened by known means and devices in order to assure the frictional grip, between the cables 3d and 3s and the respective driving pulleys 6a and 6b, and to avoid any slightest slipping of both cable rings 3d and 3s within the grooves 61a and 61b.

In the present embodiment, the tensioning of the cable rings 3d and 3s is obtained, by way of example, by placing the rear vertical pulleys 4d and 4s on respective tightening devices 41d and 41s which urge rearwards thus operating a progressive tightening of the respective cable rings 3d and 3s. After the description of the structural composition of the control device forming the object of the present invention, it is now described its manner of operating.

By means of the crank 81 and the relative driving shaft 8 it is possible to rotate the bevel gears 7a-7c which consequently rotate also the driving pulleys 6a and 6b in opposite rotating directions.

Starting from the position wherein the tarpaulin is folded and placed near the front wall 14, the rotation of said pulleys 6a and 6b in a first direction causes the movement of both cable rings 3d and 3s.

Thus, the upper portion of the cable length 3a of both the right and the left side causes the movement of the first centering 21a, which is fixed to the cable length 3a of both the right and the left side by means of the respective tubular pieces 22a. Therefore, the centering 21a is moved away from the front wall 14 and toward the rear movable gate 13.

The progressive change in the position of the centering 21a causes the following centerings 21b to be pulled in motion by the progressive unfolding of the tarpaulin.

Such operation goes on till the complete covering of the open top body 1.

It is obvious that by rotating the crank 81, the driving shaft 8 and the driving group constituted by the bevel gears 7a-7c and driving pulleys 6a and 6b in a direction which is opposite to the preceding direction, the centerings 21a and 21b will move on the reverse direction for assuming the retracted position near the front part of the open top body 1 as it is clearly indicated by light dashed lines in the FIGS. 1, 2 and 3.

The particularity of the control device forming the object of the present invention comes also from the fact that the cross between the first lengths 3c and 3f, exactly the lengths comprised between the driving pulley 6b and the horizontal pulleys 5s and 5's can be avoided, what allows to set in motion both the upper length 3a and the lower length 3b of the cable ring 3s in the same direction of the corresponding upper length 3a and lower length 3b of the cable ring 3d without risking the slipping out of the cable from the pulleys 5'd and 5's.

From what described it is clear that the control device forming the object of the present invention is constituted by very simple as well as commercially available components and it is easy to operate, easy to install as well as adjustable to any kinds of open top bodies in the industrial, agricultural and/or similar vehicles.

Moreover, all components are made as parts of a so-called do-it-yourself kit in order to reduce the installation costs. Therefore, such parts of the do-it-yourself kit are made in such a way as to be easily and directly assembled also by not-skilled persons and without the need of special-purpose tools which may be obtained only by special machine shops.

It is well understood that modifications and variations may be made to the control device forming the object of the present invention without departing however from the scope defined by the following claims with reference to the accompanying drawings and thence from the protection extent of the present industrial invention.

The invention claimed is:

1. Control device for both opening and closing sheets or tarpaulins used to cover open top bodies in industrial or agricultural vehicles wherein respective cable rings (3d and 3s) are sliding along lateral walls (12d and 12s) of an open top body (1) of said vehicles, centerings (21a and 21b), supporting the tarpaulin (2) fixed thereon, are placed on right and left upper lengths (3a) of the cable rings (3d and 3s), the centering (21a) facing to a rear part of the open top body (1) being fixed, by means of short tubular pieces (22a) at the lateral ends, on the corresponding upper lengths (3a) of said cable rings (3d and 3s) on a right and left side respectively, while centerings (21b) are sliding on said upper lengths (3a); said cable rings (3d and 3s) result in being tightened between rear lateral pulleys (4d and 4s), which are applied to rear ends of upper edges of the relative lateral gates (12d and 12s), and vertical driving pulleys (6a and 6b) which are housed in telescopic casing (9) passing through pairs of pulleys (5d,5'd and 5s,5's) which are slightly protruding from lateral ends of the casing (9) and presenting respective grooves at a same height and in alignment with grooves of the pulleys (4d and 4s), characterised in that said driving pulleys (6a and 6b) are set in motion by means of bevel gears (7a, 7b and 7c), wherein the gear (7a) with the driving pulley (6a) and the gear (7c) with the driving pulley (6b) are mounted coaxially one in front of the other on opposite sides of the central bevel gear (7b) which is manually driven by means of crank (81) and driving shaft (8), and in that lengths of the cable rings (3c and 3f) extending between said pulleys (5d,5'd and 5s,5's) are disposed parallel one another so that the upper lengths (3a) move in a same direction.

2. Control device according to claim 1, characterized in that the said rear vertical pulleys (4d and 4s) are applied to respective tightening devices (41d and 41s) which are suitably driven in order to urge the pulleys (4d and 4s) rearwards and out from the vertical driving pulleys (6a and 6b) thus allowing a suitable tensioning of the relative cable rings (3d and 3s) as well as avoiding any slightest slipping of lengths of the cable rings (3d and 3s) engaged within grooves (61a and 61b) of the respective vertical driving pulleys (6a and 6b).

3. Control device according to claim 1, characterized in that said centerings (21a and 21b) are substantially made in a telescopic manner thus allowing their adjustment to open top bodies (1) of different widths.

4. Control device according to claim 1, characterized in that said telescopic casing (9) is constituted by tubular pieces of square or rectangular cross-section, which are slidably nested one within another, and can be removable or irremovably fixed on an upper-outer portion of a front wall (14) of the open top body (1).

5. Control device according to claim 1, characterized in that the movement of the whole group of pulleys, cables and other movable parts of the control device can be obtained by manual operations as by means of service accessories.

6. Control device according to claim 2, characterized in that said centerings (21a and 21b) are substantially made in a telescopic manner thus allowing their adjustment to open top bodies (1) of different widths.

7. Control device according to claim 2, characterized in that the movement of the whole group of pulleys, cables and other movable parts of the control device can be obtained by manual operations as by means of service accessories.

8. Control device according to claim 3, characterized in that the movement of the whole group of pulleys, cables and other movable parts of the control device can be obtained by manual operations as by means of service accessories.

9. Control device according to claim 4, characterized in that the movement of the whole group of pulleys, cables and other movable parts of the control device can be obtained by manual operations as by means of service accessories.

* * * * *